US011003858B2

(12) United States Patent
Lin et al.

(10) Patent No.: US 11,003,858 B2
(45) Date of Patent: May 11, 2021

(54) AI SYSTEM TO DETERMINE ACTIONABLE INTENT

(71) Applicant: Microsoft Technology Licensing, LLC, Redmond, WA (US)

(72) Inventors: Chu-Cheng Lin, Redmond, WA (US); Michael Gamon, Seattle, WA (US); Dongyeop Kang, Redmond, WA (US); Patrick Pantel, Bellevue, WA (US); Madian Khabsa, Redmond, WA (US); Ahmed Hassan Awadallah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 38 days.

(21) Appl. No.: 15/993,045

(22) Filed: May 30, 2018

(65) Prior Publication Data

US 2019/0197107 A1  Jun. 27, 2019

Related U.S. Application Data

(60) Provisional application No. 62/610,038, filed on Dec. 22, 2017.

(51) Int. Cl.
| | | |
|---|---|---|
| *G10L 15/16* | (2006.01) |
| *G06F 40/30* | (2020.01) |
| *G06N 3/08* | (2006.01) |
| *G06N 3/04* | (2006.01) |
| *G06Q 10/10* | (2012.01) |
| *G06F 40/169* | (2020.01) |

(52) U.S. Cl.
CPC ............ *G06F 40/30* (2020.01); *G06F 40/169* (2020.01); *G06N 3/0445* (2013.01); *G06N 3/08* (2013.01); *G06Q 10/107* (2013.01)

(58) Field of Classification Search
CPC .................................................. G06F 17/2785
USPC .............................................................. 704/9
See application file for complete search history.

(56) References Cited

U.S. PATENT DOCUMENTS

| 8,489,442 B1* | 7/2013 | Mohler .............. G06Q 10/1095 705/7.12 |
| 9,998,415 B1* | 6/2018 | Meschkat ............... H04L 51/22 |
| 10,281,885 B1* | 5/2019 | Chiu .................... G05B 13/027 |
| 10,354,182 B2* | 7/2019 | Chang ................. G06F 16/3334 |

(Continued)

OTHER PUBLICATIONS

Su, et al., "Exploiting turn-taking temporal evolution for personality trait perception in dyadic conversations," IEEE/ACM Trans. on Audio, Speech, and Language Processing, 24(4):733-744, 2016.*

(Continued)

*Primary Examiner* — Jakieda R Jackson
(74) *Attorney, Agent, or Firm* — Schwegman Lundberg & Woessner, P.A.

(57) ABSTRACT

A method includes receiving an email addressed to a recipient user, processing the received email using a reparametrized recurrent neural network model to identify an action based on the received email, and wherein the reparametrized recurrent neural network model has been trained on an email dataset annotated with recipient corresponding actions and reparametrized on unannotated conversation data having structures similar to email data.

19 Claims, 8 Drawing Sheets

(56) References Cited

U.S. PATENT DOCUMENTS

| | | | | |
|---|---|---|---|---|
| 2003/0154116 | A1* | 8/2003 | Lofton | G06Q 10/109 |
| | | | | 705/7.19 |
| 2009/0165022 | A1* | 6/2009 | Madsen | G06Q 10/109 |
| | | | | 719/318 |
| 2010/0030578 | A1* | 2/2010 | Siddique | G06Q 10/0637 |
| | | | | 705/3 |
| 2010/0069035 | A1* | 3/2010 | Johnson | H04W 92/18 |
| | | | | 455/404.1 |
| 2010/0312838 | A1* | 12/2010 | Lyon | G06Q 10/109 |
| | | | | 709/206 |
| 2012/0036097 | A1* | 2/2012 | Prokhorov | G06K 9/00845 |
| | | | | 706/20 |
| 2012/0054135 | A1* | 3/2012 | Salaka | G06Q 10/107 |
| | | | | 706/13 |
| 2013/0091227 | A1* | 4/2013 | Bhakar | G06Q 10/107 |
| | | | | 709/206 |
| 2013/0132904 | A1* | 5/2013 | Primiani | G06F 3/048 |
| | | | | 715/834 |
| 2013/0282627 | A1* | 10/2013 | Faddoul | H04L 51/12 |
| | | | | 706/12 |
| 2015/0046233 | A1* | 2/2015 | Srulowitz | G06Q 10/06398 |
| | | | | 705/7.42 |
| 2015/0254057 | A1* | 9/2015 | Klein | G06F 3/167 |
| | | | | 704/275 |
| 2015/0339477 | A1* | 11/2015 | Abrams | G06F 21/316 |
| | | | | 726/23 |
| 2016/0018959 | A1* | 1/2016 | Yamashita | G06F 3/0484 |
| | | | | 715/716 |
| 2016/0026608 | A1* | 1/2016 | Curin | G10L 15/22 |
| | | | | 715/230 |
| 2016/0098592 | A1* | 4/2016 | Lee | G06K 9/00315 |
| | | | | 434/236 |
| 2016/0232440 | A1* | 8/2016 | Gregor | G06N 3/0445 |
| 2016/0330144 | A1* | 11/2016 | Dymetman | H04L 51/02 |
| 2017/0161372 | A1* | 6/2017 | Fern Ndez | G06F 40/268 |
| 2017/0372200 | A1* | 12/2017 | Chen | G06N 3/08 |
| 2018/0060793 | A1* | 3/2018 | Sama | G06N 20/00 |
| 2018/0189659 | A1* | 7/2018 | Manna | G06F 11/0709 |
| 2018/0203848 | A1* | 7/2018 | Perez | G10L 25/30 |
| 2018/0218734 | A1* | 8/2018 | Somech | G10L 15/16 |
| 2018/0225032 | A1* | 8/2018 | Jones | G06K 9/00456 |
| 2018/0226071 | A1* | 8/2018 | Winter | G06F 40/284 |
| 2018/0349765 | A1* | 12/2018 | Dymetman | G06N 3/0445 |
| 2018/0365220 | A1* | 12/2018 | Chakraborty | G06F 17/2785 |
| 2019/0005945 | A1* | 1/2019 | Hofer | G10L 15/16 |
| 2019/0065033 | A1* | 2/2019 | Kulkarni | G06F 3/04842 |
| 2019/0065460 | A1* | 2/2019 | Xin | G06F 17/278 |
| 2019/0139092 | A1* | 5/2019 | Nomula | G06Q 30/0269 |
| 2019/0156211 | A1* | 5/2019 | Dong | G06N 3/084 |

OTHER PUBLICATIONS

Salimans et al. "Weight Normalization: A Simple Reparameterization to Accelerate Training of Deep Neural Networks" 30th Conference on Neural Information Processing Systems, pp. 1-9, 2016.*

Agema, Leonie Eline, "Death by e-mail overload", In Proceedings of 5th IBA Bachelor Thesis Conference, Jul. 2, 2015, 33 Pages.

Ammar, et al., "Many languages, one parser", In Journal of Transactions of the Association for Computational Linguistics, vol. 4, Feb. 4, 2016, 14 Pages.

Arguello, et al., "Predicting speech acts in MOOC forum posts", In Proceedings of the 9th International AAAI Conference on Web and Social media, May 26, 2015, 10 Pages.

Caruana, Rich, "Multitask learning", In Journal of Machine learning, vol. 28, No. 1, Jul. 1, 1997, pp. 41-75.

Carvalho, Victor R., "Modeling Intention in Email. Speech Acts, Information Leaks and Recommendation Models", In Publication of Springer, Retrieved on: Nov. 10, 2017, 111 Pages.

Cohen, et al., "Learning to classify email into "speech acts"", In Proceedings of the Conference on Empirical Methods in Natural Language Processing, Jul. 25, 2004, 8 Pages.

Collobert, et al.,, "A Unified Architecture for Natural Language Processing: Deep Neural Networks with Multitask Learning", In Proceedings of the 25th international conference on Machine learning, Jul. 5, 2008, pp. 160-167., Jul. 5, 2008, pp. 160-167.

Collobert, et al., "Natural Language Processing (Almost) from Scratch", In Journal of Machine Learning Research, vol. 12, Aug. 2011, pp. 2493-2537.

Corston-Oliver, et al., "Integration of Email and Task Lists", In Proceedings American Association for Artificial Intelligence, Jul. 1, 2004, 2 Pages.

Daume'III, Hal, "Frustratingly Easy Domain Adaptation", In the Proceedings of the 45th Annual Meeting of the Association of Computational Linguistics, Jun. 2007, pp. 256-263.

Dredze, et al., "Intelligent email: Reply and attachment prediction", In Proceedings of the International Conference on Intelligent User Interfaces, Jan. 13, 2008, 4 Pages.

Eisenstein, et al., "Sparse additive generative models of text", In Proceedings of the 28th International Conference on Machine Learning, Jun. 28, 2011, 8 Pages.

Felice, et al., "Identifying speech acts in e-mails: Toward automated scoring of the toeic e-mail task", In ETS Research Report Series—ETS RR-12-16, Sep. 2012, 71 Pages.

Finkel, et al., "Hierarchical bayesian domain adaptation", In Proceedings of Human Language Technologies: The 2009 Annual Conference of the North American Chapter of the Association for Computational Linguistics, May 31, 2009, pp. 602-610.

Glorot, et al., "Domain adaptation for large-scale sentiment classification: A deep learning approach", In Proceedings of the 28th international conference on machine learning, Jun. 28, 2011, 8 Pages.

Goldstein, et al., "Using speech acts to categorize email and identify email genres", In Proceedings of the 39th Annual Hawaii International Conference on System Sciences, Jan. 4, 2006, pp. 1-10.

Ha, et al., "Hypernetworks", In Journal of Computing Research Repository, Sep. 2016, pp. 1-29.

Iyyer, et al., "Deep unordered composition rivals syntactic methods for text classification", In Proceedings of the 53rd Annual Meeting of the Association for Computational Linguistics, Jul. 26, 2015, 11 Pages.

Jeong, et al., "Semi-supervised speech act recognition in emails and forums", In Proceedings of the Conference on Empirical Methods in Natural Language Processing: vol. 3, Aug. 6, 2009, pp. 1250-1259.

Kannan, et al., "Smart reply: Automated response suggestion for email", In Journal of Computing Research Repository, Jun. 2016, 10 Pages.

Khoussainov, et al., "Email task management: An iterative relational learning approach", In Proceedings of Second Conference on Email and Anti-Spam, Jul. 21, 2015, 8 Pages.

Kim, et al., "Frustratingly easy neural domain adaptation", In Proceedings of the 26th International Conference on Computational Linguistics: Technical Papers, Dec. 11, 2016, pp. 387-396.

Kingma, et al., "Adam: A method for stochastic optimization", In Journal of Computing Research Repository, Dec. 2014, pp. 1-15.

Klimt, et al., "The enron corpus: A new dataset for email classification research", In Proceedings of the 15th European Conference on Machine Learning, Sep. 20, 2004, 11 Pages.

Lampert, et al., "The Nature of Requests and Commitments in Email Messages", In Proceedings of EMAIL-2008: The AAAI Workshop on Enhanced Messaging, Jul. 13, 2008, pp. 42-47.

Li, et al., "A persona-based neural conversation model", In Journal of Computing Research Repository, Mar. 2016, 10 Pages.

Moldovan, et al., "Automated Speech Act Classification for Online Chat", In Proceedings of 22nd Midwest Artificial Intelligence and Cognitive Science Conference, Apr. 16, 2011, 7 Pages.

Corston-Oliver, et al., "Task-focused Summarization of Email", In Proceedings of Association for Computational Linguistics, Jul. 1, 2004, 8 Pages.

Peng, et al., "Multi-task Domain Adaptation for Sequence Tagging", In Journal of Computing Research Repository, Aug. 9, 2016, 10 Pages.

(56) References Cited

OTHER PUBLICATIONS

Ragni, et al., "Multi-language neural network language models", In Proceedings of the Annual Conference of the International Speech Communication Association, Sep. 8, 2016, 5 Pages.

Riezler, Stefan, "On the problem of theoretical terms in empirical computational linguistics", In Journal of Computational Linguistics, vol. 40, Issue 1, Mar. 4, 2014, pp. 235-245.

Rush, et al., "A Neural Attention Model for Abstractive Sentence Summarization", In Journal of Computing Research Repository, Sep. 2015, pp. 379-389.

Lowe, et al., "The Ubuntu Dialogue Corpus: A Large Dataset for Research in Unstructured Multi-Turn Dialogue Systems", In Journal of the Computing Research Repository, vol. 3, Jun. 2015, 10 Pages.

Searle, John R., "A classification of illocutionary acts", In Journal of Language in society, vol. 5, Issue 1, Apr. 1976, pp. 1-23.

Spieckermann, et al., "Data-efficient temporal regression with multi-task recurrent neural networks", In Proceedings of NIPS Workshop on Transfer and Multi-Task Learning, Dec. 2014, pp. 1-5.

Tai, et al., "Improved semantic representations from tree-structured long short-term memory networks", In Journal of Computing Research Repository, Feb. 28, 2015, 11 Pages.

Traum, David R., "Speech acts for dialogue agents", In Publication of Springer, Retrieved on: Nov. 10, 2017, pp. 1-39.

Yang, et al., "A Unified Perspective on Multi-Domain and Multi-Task Learning", In Journal of Computing Research Repository, Dec. 23, 2014, pp. 1-9.

Yang, et al., "Deep multi-task representation learning: A tensor factorisation approach", In Journal of Computing Research Repository, May 20, 2016, pp. 1-12.

Yang, et al., "Multi-task cross-lingual sequence tagging from scratch", In Journal of Computing Research Repository, Mar. 20, 2016, 10 Pages.

Yang, et al., "Transfer Learning for Sequence Tagging with Hierarchical Recurrent Networks", In Journal of Computing Research Repository, Mar. 18, 2017, pp. 1-10.

Lin, et al., "Actionable Email Intent Modeling with Reparametrized RNNs", The Thirty-Second AAAI Conference on Artificial Intelligence (AAAI-18), 2018, pp. 4856-4864.

"International Search Report and Written Opinion Issued in PCT Application No. PCT/US2018/065309", dated Feb. 21, 2019, 12 Pages.

Zhang, et al., "Email Category Prediction", In Proceedings of the 26th International World Wide Web Conference, Apr. 3, 2017, 9 Pages.

\* cited by examiner

| ACTION | DESCRIPTION |
|---|---|
| REPLY-YESNO | SHORT YES/NO REPLY TO A QUESTION RAISED IN THE PREVIOUS EMAIL |
| REPLY-ACK | SIMPLE ACKNOWLEDGEMENTS SUCH AS "GOT IT", "THANK YOU." |
| REPLY-OTHER | REPLY TO THE THREAD BASED ON INFORMATION THAT IS AVAILABLE WITHOUT DOING ANY ADDITIONAL INVESTIGATION. |
| INVESTIGATE | LOOK INTO SOME QUESTIONS/PROBLEMS TO GATHER THE NECESSARY INFORMATION AND REPLY WITH THAT INFORMATION. |
| SEND-NEW-EMAIL | WRITE A NEW EMAIL THAT IS NOT A REPLY TO THE CURRENT THREAD. |
| SETUP-APPOINTMENT | SET UP APPOINTMENTS/CANCEL APPOINTMENTS. |
| APPROVE-REQUEST | APPROVE REQUESTS (TYPICALLY FROM SUBORDINATES) THROUGH AN EXTERNAL SYSTEM SUCH AS AN EXPENSE REPORT SYSTEM ETC. |
| SHARE-CONTENT | SHARE CONTENT, AS AN ATTACHMENT, A LINK IN THE EMAIL BODY, OR A LOCATION ON THE NETWORK THAT IS KNOWN TO BOTH THE SENDER AND RECIPIENTS |

| DATASET | MESSAGE |
|---|---|
| IRC | could somebody explain how i get the oss compatibility drivers to load automatically in ubuntu? |
| IRC | you should try these ones , apt src deb _URL_ unstable/ |
| IRC | ah , cool . Thanks , I'll try that . |
| REDDIT | Does this really appeal to Sanders supporters ? can one ( or more of you) explain to me why ? Full disclosure : I do n't pay ATM fees . |

FIG. 4

| NAME | DATASET | DESCRIPTION |
|---|---|---|
| E-T | EMAIL | END OF AN EMAIL THREAD |
| E-A | EMAIL | THIS MESSAGE HAS ATTACHMENT(S) |
| I-T | IRC | TURNTAKING |
| R-T | REDDIT | END OF A REDDIT THREAD |

FIG. 5

| DATASET NAME (TYPE) | # OF THREADS | # OF MESSAGES | AVERAGE THREAD LENGTH | AVERAGE MESSAGE LENGTH |
|---|---|---|---|---|
| AVACADO (EMAIL) | 50 890 | 121 917 | 2.4 | 73.0 |
| R/POLITICS (REDDIT) | 15 813 | 42 952 | 2.7 | 31.4 |
| UBUNTU DIALOG (IRC) | 50 812 | 416 721 | 8.2 | 12.7 |

AI SYSTEM TO DETERMINE ACTIONABLE INTENT

RELATED APPLICATION

This application claims priority to U.S. Provisional Application Ser. No. 62/610,038 (entitled AI System to Determine Actionable Intent, filed Dec. 22, 2017) which is incorporated herein by reference.

BACKGROUND

Despite the emergence of many new communication tools in the workplace, email remains a major, if not the dominant, messaging platform in many organizations. Many people receive hundreds of email messages and other communications each day. Responding to or otherwise acting on each email in a timely manner can consume significant amounts of time, interfering with other job responsibilities. Helping people manage and act on their emails can make them more productive.

SUMMARY

A method includes receiving an email addressed to a recipient user, processing the received email using a reparametrized recurrent neural network model to identify an action based on the received email, and wherein the reparametrized recurrent neural network model has been trained on an email dataset annotated with recipient corresponding actions and reparametrized on unannotated conversation data having structures similar to email data.

A machine-readable storage device has instructions for execution by a processor of a machine to cause the processor to perform operations to perform a method of generating a model. The method includes receiving a communication addressed to a recipient user, processing the received communication using a reparametrized recurrent neural network model to identify an action based on the received email, and wherein the reparametrized recurrent neural network model has been trained on a communication dataset annotated with recipient corresponding actions and reparametrized on unannotated conversation data having structures similar to the communication dataset data.

A system includes one or more processors and a storage device coupled to the one or more processors having instructions stored thereon to cause the one or more processors to execute intent recognition operations. The operations include receiving a communication addressed to a recipient user, processing the received communication using a reparametrized recurrent neural network model to identify an action based on the received communication, and wherein the reparametrized recurrent neural network model has been trained on a communication dataset from a first domain, annotated with recipient corresponding actions, wherein the first domain correlates to the received communication, and reparametrized on unannotated conversation data from a second domain having structures similar to email data.

A computer implemented method of training a recurrent neural network (RNN) for identifying actions responsive to received emails includes operations comprising initializing weights of the RNN, training the RNN on a target domain set of recipient action annotated emails, and reparametrizing the RNN on unannotated conversation data threads.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized, and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, tuning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Most current automated email replies have minimal intelligence, other than filters, and generally do not tailor a reply based on the substance of the original email. For example, consider a system that is capable of predicting a recipient's next action when receiving an email. The system could offer assistance to accomplish that action, for example in the form of a quick reply, adding a task to the recipient's to-do list, or helping the recipient take action against another system. To build and train such systems, email data sets may be used, but unfortunately public email datasets such as Klimt and Yang 2004 and Oard et al. 2015, are not annotated and may be too small to be useful in training a machine learning system to perform such actions reliably. Such public email datasets also lack direct information/annotation regarding the recipients' actions, other than perhaps email replies. Still further, annotation of even such a small database can be laborious In embodiments of the inventive subject matter, an annotation scheme for actions is applied to a corpus of publicly available emails for use in a machine learning system that processes emails and generates actions based on recipient intent. In order to overcome the lack of sufficient email training data for end-to-end training, other data from what may be referred to as secondary domains is used. The data from secondary domains that contain structures similar to email and recipient actions are annotated in a limited manner that may not include actions, but is useful for training purposes. Multitask and multidomain learning, which use domain or task invariant knowledge to improve performance on a specific task/domain, are used to train the system. Such secondary domains and tasks in combination with multitask and multidomain learning can help a system model discover invariant structures in conversations that improve a classifier on the primary data and task: email recipient action classification.

More particularly, an action-based annotation scheme is used to annotate emails with respect to actions a user takes or is expected to take in response to receiving an email rather than sender intent in sending an email. Since the email data may not be large enough for end-to-end training, training may be enriched with additional semantic and pragmatic information derived from other tasks and domains without annotation for expected action (e.g., IRC (internet relay chat) and Reddit, as well as threaded messages from other domains). In one embodiment, a model referred to as a Recurrent AttentIve Neural Bag-Of-Word model (RAINBOW) for multi-task RNN reparametrization may be used.

Previous work in natural language processing tackled multidomain/multitask learning by use of a shared representation space. The overall model architecture generally is unchanged from the single-domain single-task setting; but the learned representations were reparametrized to take account of knowledge from additional data and task/domain knowledge. Such shared representation space encoders do not perform well on previously unseen tasks.

As opposed to encoding all the data and descriptions into a shared representation space, embodiments of the present inventive subject matter train multiple parameter-shared models across different domains and tasks jointly, without maintaining a shared encoded representation in the network.

An annotation scheme designed for workplace email recipient actions may be used to annotate a set of emails to produce an annotated domain specific dataset for use in training. A family of reparametrized recurrent neural network (RNN) models is created for both multitask and multidomain learning. Such models encode domain-invariant features and, in the absence of sufficient data for end-to-end learning, still provide useful features for scoping tasks in an unsupervised learning setting. Reparametrized long short-term memory (LSTM) networks are recurrent neural networks which may be used as building components or blocks of hidden layers of an RNN. Such LSTM networks utilize a sequence of cells that are used to weight words in a communication, allowing words to be remembered or forgotten as the communication is processed by the network. For instance, a change of subject may result in the new subject being valued higher than the old subject relative to new words being processed. In other words, the next word encountered is more likely to be related to the new subject and less related to the old subject. The same concept is applied to likely tasks that should be generated.

Reparametrized LSTM networks consistently achieve better likelihood and overall accuracy on test data than common domain adaption variants. The representation extracted from a network instantiated with the shared parameter weights performs well on a previously unseen task.

Figure 1:
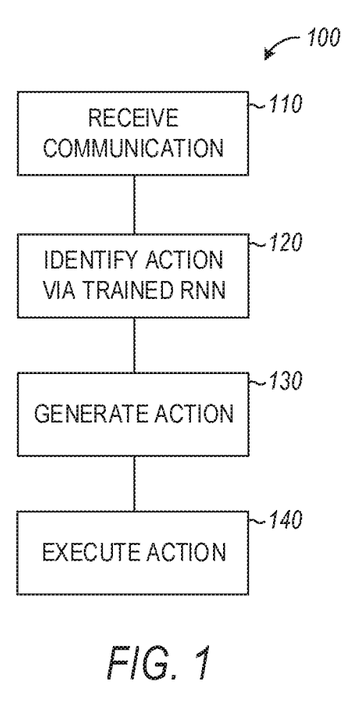
FIG. 1 is a flowchart illustrating a computer implemented method of generating actions responsive to email communications according to an example embodiment.

FIG. 1 is a flowchart illustrating a method 100 of generating actions responsive to email communications using a reparametrized recurrent neural network. Method 100 includes receiving at operation 110 a communication, such as an email addressed to a recipient user. The communication may be an email, text message, or other type of communication, including a paper memo or letter that has been scanned and run through optical character recognition (OCR) to provide a digital representation of the words of the communication. The received communication is processed by operation 120 using a reparametrized recurrent neural network (RNN) model to identify an action based on the received email. The action is generated at operation 130.

Identification of the action may include simply identifying the type of action to take, which generating the action may include further operations including interfacing with other programs to generate a responsive communication and obtaining further information to add to or control the action.

In one embodiment, the action may comprise an email response with data requested in a received email. The network may identify a general action, such as response via email, which then may interact with an email program, such as Outlook, using an application programming interface, to reply or suggest a reply to the received email. The email response may be populated with data requested in the received email. The data may be provided by a search engine that can process a natural language query identified in the received email, such as "When will the Apollo project be completed". The results from that query may simply be "January 14." Further interaction with the email program may include commanding the email program to send the message using a common application programming interface.

In a further embodiment, the action may comprise setting up a calendar appointment. The network may identify one or more of a time, date, location, call-in information, and invitees, and interface with Outlook to generate a meeting request based on such data. Execution of the action would then be sending the meeting request.

Further actions, such as replying yes or no to a question in the received email, simply acknowledging receipt, sharing requested content, and others may be performed in a similar manner. In some embodiments, execution of the action may be approved via user input prior to execution, or simply automatically executed responsive to completion of generation of the action.

The reparametrized recurrent neural network model is trained on an email dataset annotated with recipient corresponding actions and reparametrized on unannotated conversation data having structures similar to email data. In one embodiment, the model is parameterized as a function of shared components and domain specific components. The model may be an LSTM model in further embodiments.

At operation 140, the action may be taken, either directly without user interaction, or with a user interaction, such as a user selecting to proceed with the action via keyboard, touchpad, or any other means for interacting with a device implementing method 100.

Figure 2:
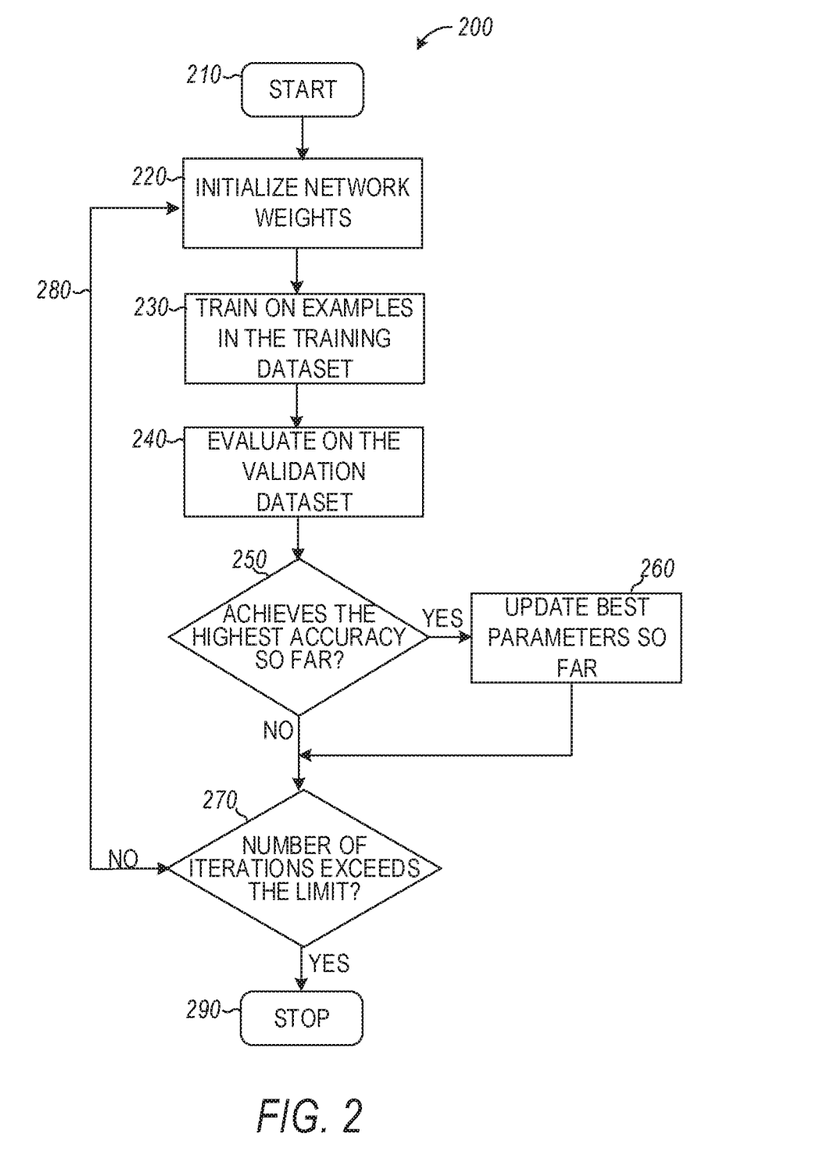
FIG. 2 is a flowchart illustrating a computer implemented method of training a recurrent neural network (RNN) according to an example embodiment.

Training of the RNN is performed according to a method 200 represented in flowchart form in FIG. 2. The method starts at 210. Operation 220 initializes the RNN neuron weights. The weights may be initialized randomly in some embodiments or may be set to one or more selected values between a range, for example between −1 and +1. Training of the RNN is performed at operation 230 using a training dataset. The training data set includes an annotated email data set that is annotated with likely actions, as well as other data that may be structurally similar to email. The other data may include prediction labels, such as structural related labels identifying an end of an email thread, messages with attachments, turn taking, and an end of a Reddit thread. In other words, the labels are representative of the structure of the other data for which emails exhibit the same type of structure. Email may occur in an email thread with an end, may have attachments, and the email threads may exhibit turn taking, where different users email and reply to emails, taking turns, or replying twice to an email without an intervening reply for example. Further detail regarding the annotation and labeling is provided below.

At operation 240, validation of the RNN is performed by using a portion of the training data not used for training. The portion of the training data is submitted to the trained RNN to determine if the annotated action is the action selected by the RNN. Decision operation 250 is executed to determine if the model has achieved the highest accuracy so far in the training process 200. If yes, the model is updated with the best parameters so far at operation 260. If no, or after the model is updated at operation 260, a check is made at decision operation 270 if a number of iterations of method 200 has exceeded a limit. If not, method 200 returns to operation 220 to initialize the network weights again, as indicated at line 280. If the iteration limit has been exceeded, training is complete, and method 200 stops at 290.

In one example embodiment, email messages that are annotated and evaluated are part of the Avocado dataset (Oard et al. 2015), which consists of emails and attachments taken from 279 accounts of a defunct information technology company referred to as "Avocado". Email threads may be reconstructed from recipients' mailboxes. In one example, complete threads (threads that contain all replies) and linear (every follow-up is a reply to the previous email) threads may be used.

Workplace email is known to be highly task-oriented. As opposed to chit chat (inconsequential discussions or talk about trivial matters) on the Internet, speaker intent and expected action on email are in general very precise. Annotating the email with such expected actions results in a better prediction of actions a reader would take responsive to an email or email thread. Annotating recipient actions has the following advantages over annotating sender intent: First, action based annotation is not tied to a particular speech-act taxonomy. The design of such a taxonomy is highly dependent on use cases, and definitions of sender intent can be circular.

Even within a single target domain such as email, there have been several different sender intent taxonomies. A speech-act-agnostic scheme that focuses on the recipient's action generalizes better across scenarios. The new annotation scheme also has a lower risk of injection bias because the annotation relies on expected (or even observed) actions performed in response to an email, as opposed to relying on the annotator's intuition about the sender's intent. Lastly, while annotators may be relied upon for action annotations, many of the annotated actions used in one embodiment translate into very specific actions on the computer. Therefore intelligent user interfaces may be used to capture and remind users of such email actions, allowing the user to approve execution of the actions or allow the actions to be automatically executed without user approval.

Figure 3:
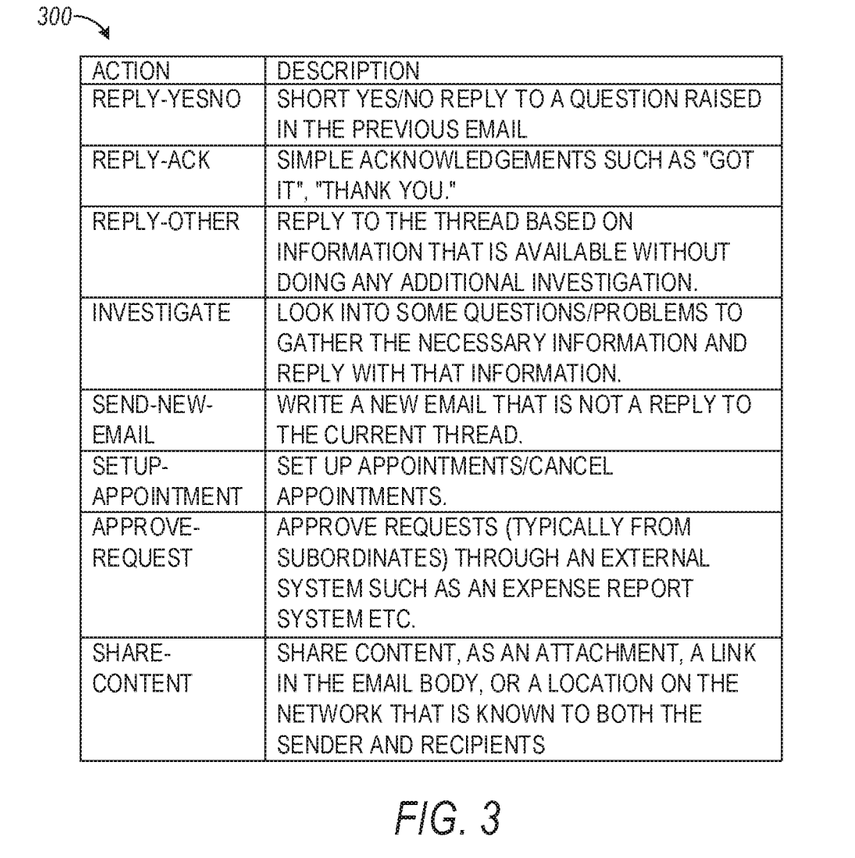
FIG. 3 is a table of example actions responsive to a target domain communication according to an example embodiment.

One example set of actions is shown in table form in FIG. 3 at table 300. The actions fall into three broad categories in this example, referred to as message sending, software interaction, and share content. Note that table 300 is used as an example, and that there are likely other categories and actions that may be used to annotate communications in further embodiments.

Message sending: In many cases, the recipient is most likely to send out another email, either as a reply to the sender or to someone else. As listed in table 300, REPLY-YESNO, REPLY-ACK, REPLY-OTHER, INVESTIGATE, SEND-NEW-EMAIL are actions that send out a new email, either on the same thread or a new one.

Software interaction: The most likely recipient actions are interaction with office software such as SETUP-APPOINTMENT and APPROVE-REQUEST.

Share content: On many occasions, the most likely actions are to share a document, either as an attachment or via other means. An umbrella action SHARE-CONTENT is used to capture these actions.

A subset of the preprocessed email threads are subsequently annotated. In one embodiment, people serve as annotators to annotate the emails, also referred to as messages or communications, with actions from the set of actions in table 300. Each annotator is asked to imagine that they are a recipient of threaded emails in a workplace environment. Although not required, it may be helpful for the annotators to have experience in a similar work environment from which the emails originated. For each message, the annotator reads through the previous messages in the thread, and annotates with the most likely action (in table 300) they may perform if they had been the addressee of that message. If the most probable action is not defined the set of actions, the annotators annotate with an OTHER action.

In one example, a total of 399 emails from 110 distinct threads were annotated. A Cohen's Kappa was 0:75 for the annotators in the example. Disagreements between multiple annotators may be arbitrated or selected by majority vote.

The annotations collected were comparable in size to other speech act based annotation datasets. However, like other expert-annotated datasets, the dataset was not large enough for end-to-end training. Therefore, training was enriched with additional semantic and pragmatic information derived from other tasks and domains without annotation for expected action.

Data from the additional domains, such as IRC and Reddit may be included for multidomain learning. The use of such data can both augment the training of the training and save time and expense of obtaining and annotating additional communication threads from the target domain.

IRC: The Ubuntu Dialog Corpus is a curated collection of chat logs from Ubuntu's Internet Relay Chat technical support channels (Lowe et al. 2015).

Reddit: Reddit is an internet discussion community consisting of several subreddits, each of which is more or less a discussion forum pertaining to a certain topic. A dataset may be curated from the subreddit r/politics over two consecutive months. Each entry in the dataset consists of the post title, an optional post body, and an accompanying tree of comments. Linear threads may be collected by recursively sampling from the trees.

Figure 4:
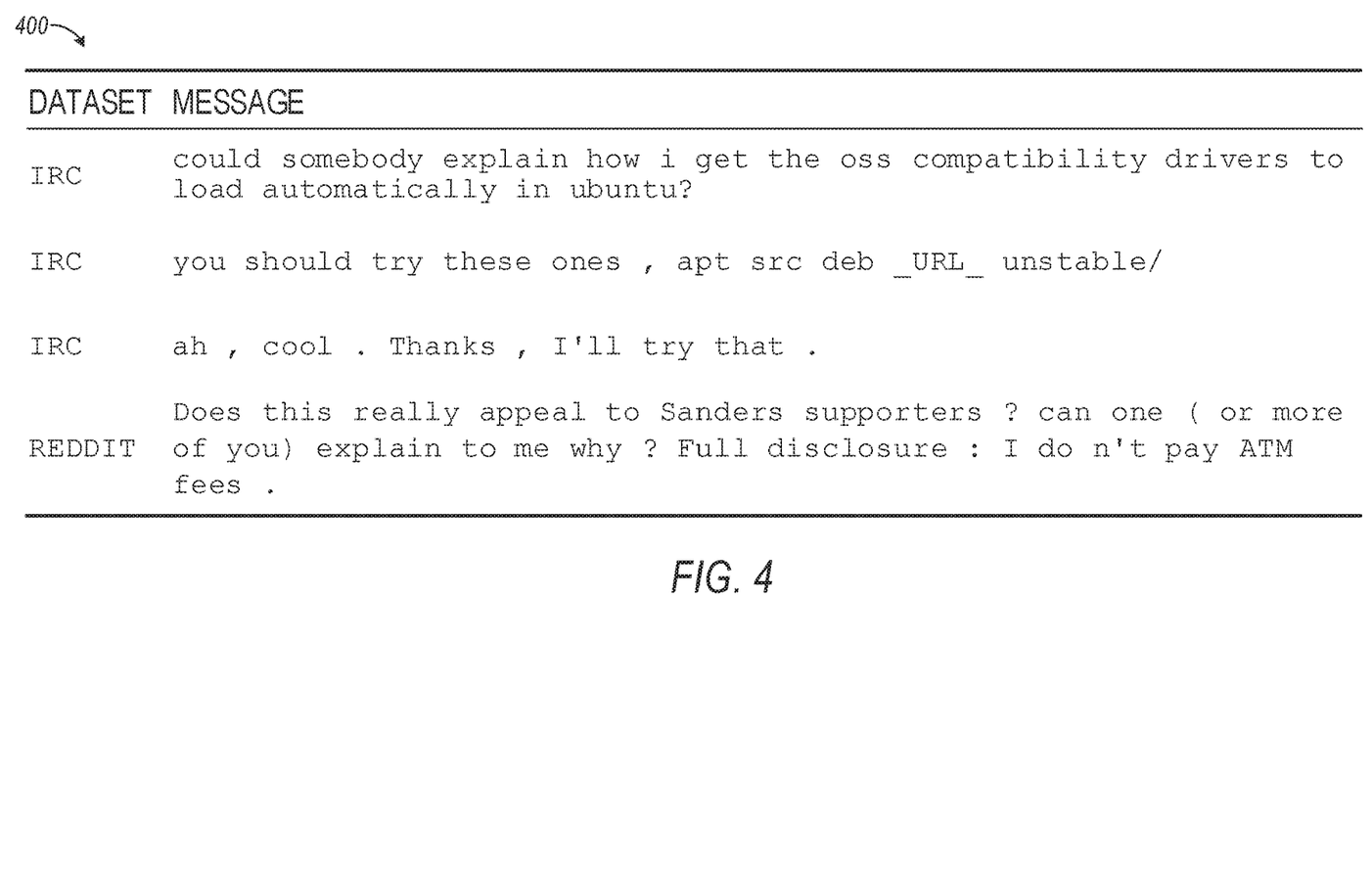
FIG. 4 is an example of data from additional domains according to an example embodiment.

Examples of data from the additional domains are shown in table 400 in FIG. 4. These examples are likely to elicit actions related to those observed in email data. IRC chats are very task specific and are mostly about technical help. It is observed that many conversational turns start with information requests followed by delivery of that information. One example in table 400 includes a request for information: "could somebody explain how I get the oss compatibility drivers to load automatically in the ubuntu?" The information provided in response was: "you should try these ones, apt src debUURL_unstable/". The Reddit dataset on the other hand is more diverse, including discussions in r/politics more or less pertaining to comments on American public policies and politics. Messages that require a recipient to take an action are rare, so there is very little information for learning about which action to predict.

Figure 5:
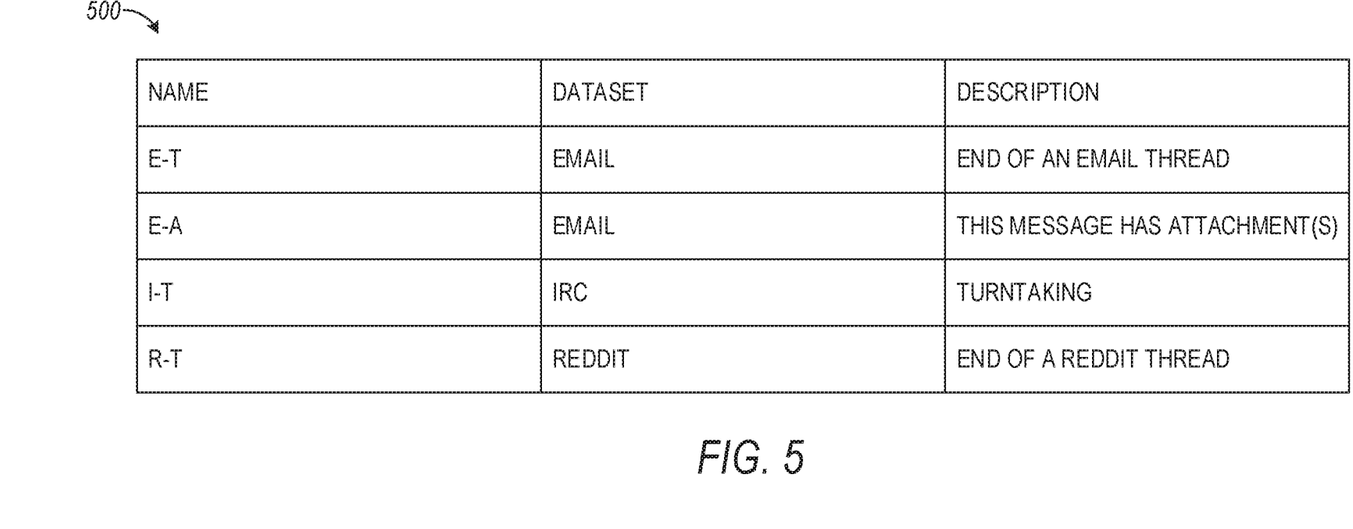
FIG. 5 is a table of example labels for communications from various domains according to an example embodiment.

FIG. 5 is a table 500 that illustrates prediction labels for multitask learning that may be extracted from the data from the target domain, email, and from additional domains, in this case, IRC and Reddit. Email messages may be labeled as (E-T) end of an email thread and (E-A) this message has attachments(s). IRC communications can be labeled as (I-T), corresponding to turn taking, and Reddit communications can be labeled as (R-T) corresponding to the end of a Reddit thread.

Messages from IRC and Reddit are less precise in terms of speaker intent. Thus, the recipient action scheme is not directly applicable to such messages. However, previous studies on speech acts in Internet forums and chatrooms have shown that there are speech acts common to all these heterogeneous domains, e.g. information requests and deliveries. More data from these domains will help recognition of these speech acts, which in turn help recognize the resulting recipient actions.

In one embodiment, half of the dataset may be used as training data, a quarter as the validation data, and the remaining quarter as test data. Other proportions may be used in further embodiments.

The datasets are largely unlabeled as far as recipient actions are concerned, except for the small subset of Avocado data that was manually annotated. However useful information may still be extracted via machine executed software or by human from their metadata, such as inferred end-of-thread markers (E-T) or system-logged events that can be used to formulate additional prediction tasks for a multitask learning setting as shown in table 500. These multitask labels may also be used to evaluate the multitaskdomain model described in further detail below.

Figure 6:
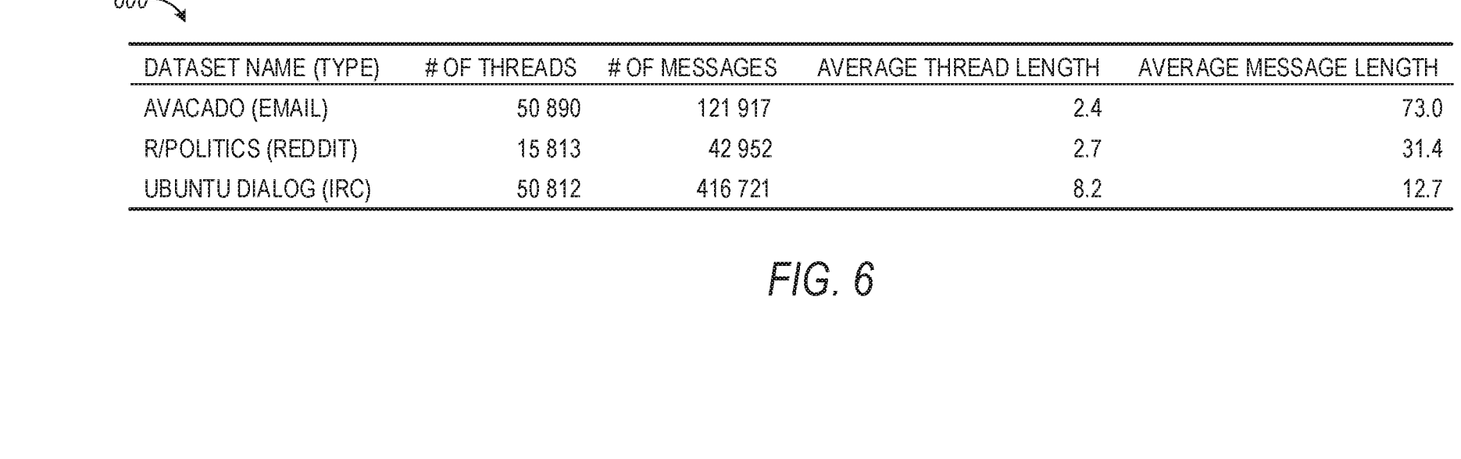
FIG. 6 is a table of example statistics regarding communications from various domains according to an example embodiment.

FIG. 6 includes a table 600 showing statistics of conversational data used in the example training data. The number of threads in each domain are shown in the first column, the number of messages in the second column, the average number of emails in a thread in the third column, and the average number of words in each message in a fourth column. In one embodiment, each message may be truncated to 256 words, including BOS and EOS symbols. Each thread was truncated to 32 messages if necessary. The truncation was done to match the Avocado dataset size for faster training and evaluation of the model.

In one embodiment, threaded messages may be modeled as a two-layered hierarchy: at the lower level a message m consists of an ordered list of words: $m=[w_{1:|M|}]$. And in turn, a thread x is an ordered list of messages: $x=[m1 \ldots |x|]$. It assumed that each message thread is from a specific domain; and therefore a many-to-one mapping $f(x)=d$ where $d \in D$ is the set of all domains is defined. The tasks are defined to be $t \in T$ which have a many-to-one mapping $g(t)=d, d \in D$. For prediction, a predictor of task t is defined as $h_r(x): X \rightarrow Y$, which predicts sequential tags $y=[y_1 : : : y_{|x|}] \in Y$ from a thread x on (a valid) task t. A real-valued task loss of task t on thread x is defined to be $\ell_t(y, \hat{y}): y \times y \rightarrow \mathbb{R}$, where $\hat{y} \in y$ is the ground truth.

A multitask loss $l_{MT}$ is defined as the sum of task losses of tasks $\{t_d\}$ under the same domain d for a single (output, ground truth) pair $(y, \hat{y})$:

$$l_{MT}(\{t_d\}, y, \hat{y}) = \sum_{t \in \{t_d\}} \ell_t(y, \hat{y}),$$

and the aggregate loss $$L_{MT}(\{t_d\}, \{y^{(d)}_{1 \ldots K_d}, \hat{y}^{(d)}_{1 \ldots K_d}\}) = \sum_{k=1}^{K_d} l_{MT}(\{t_d\}, y^{(d)}_k, \hat{y}^{(d)}_k)$$

is defined as the sum over $K_d$ examples. The multidomain loss $L_{MD}$ is defined to be the sum of aggregate losses over D:

$$L_{MD}(\{\{y^{(d)}_{1\ldots K_d}, \hat{y}^{(d)}_{1\ldots K_d}\} \mid d \in D\}) = \qquad (1)$$

$$\sum_{d \in D} L_{MT}(\{t \mid g(t) = d\}, \{y^{(d)}_{1\ldots K_d}, \hat{y}^{(d)}_{1\ldots K_d}\})$$

Figure 7:
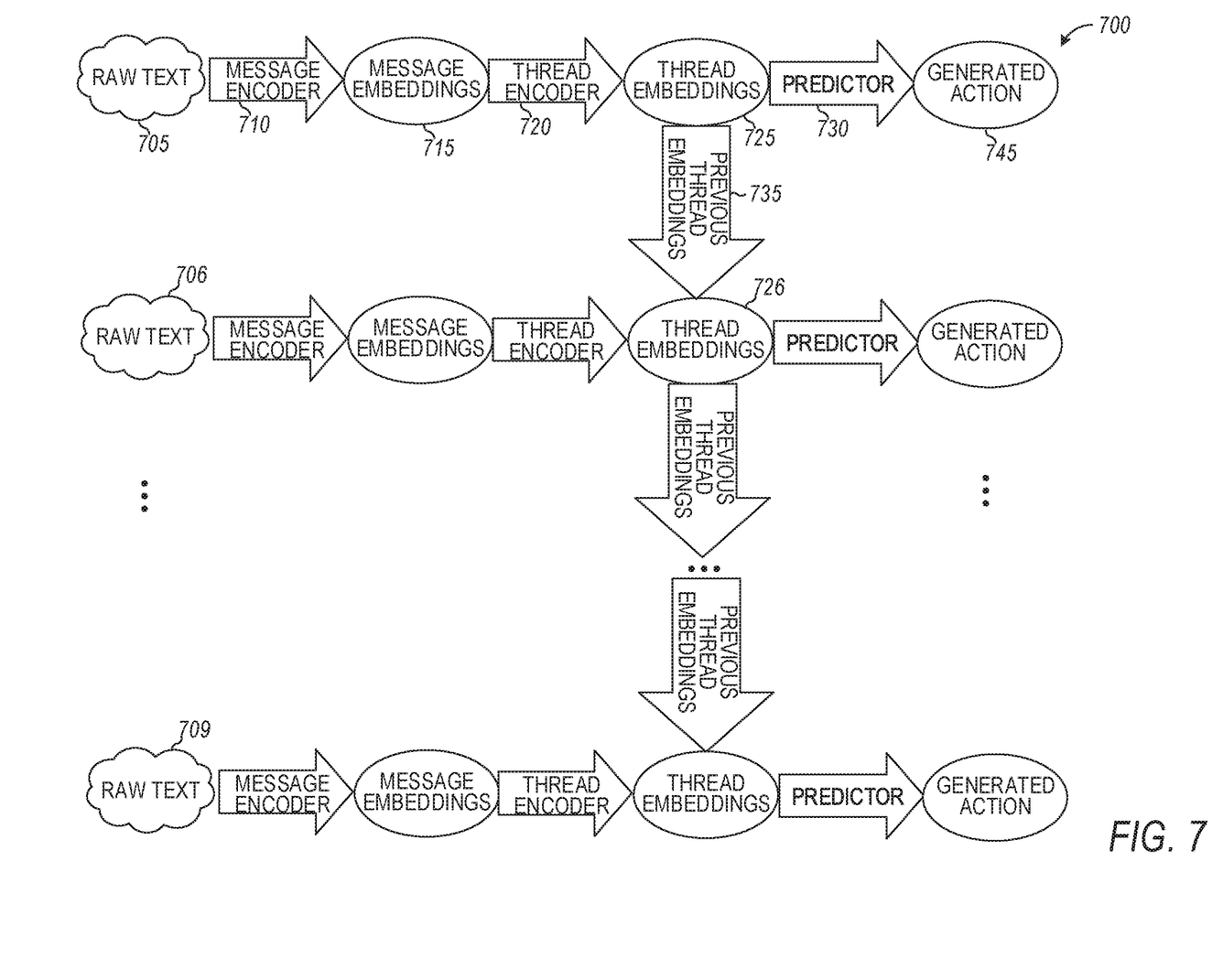
FIG. 7 is a block flow diagram of processing threaded messages according to an example embodiment.

A Recurrent AttentIve Neural Bag-Of-Word model (RAINBOW) is used as a baseline model 700 of threaded messages as illustrated in block flow form in FIG. 7. Email 705 is a first email in a thread, with successive emails in the thread represented at 706 . . . 709. As previously mentioned, there may be up to 256 emails in the thread, so there are 256 rows represented in FIG. 7. Fewer or more rows may be used for different length threads in further embodiments. For convenience of illustration, only the first row has reference numbers, but succeeding rows operate in essentially the same manner on successive emails in the thread.

From a high-level view, RAINBOW is a hierarchical neural network with two encoder layers: the lower layer is a neural bag-of-words encoder 710 that encodes each message m, raw communication text 705, into its message embeddings b(m) 715. And in turn, the upper level thread encoder 720 transforms the independently encoded message embeddings [b(m$_1$) . . . b(m$_{|x|}$)] into thread embeddings 725 via a learned recurrent neural network $e_1 \ldots e_{|x|} = f_{RNN}$ (b(m$_1$) . . . b(m$_{|x|}$)). (There is a slight abuse of annotation since $f_{RNN}$ actually differs for x of different lengths.) RAINBOW has three main components: message encoder 710, thread encoder 720, and predictor 730.

Message encoder b(m) 710 may be implemented as a bag of words model over {w} in m. Motivated by the unigram features in previous work on email intent modeling, an attentive pooling layer may be added to pick up important keywords. The averaged embeddings then undergo a non-linear transformation:

$$b(m) = q\left(\sum_{w \in m} \frac{\exp(a(emb(w)))}{\sum_{w' \in m} \exp(a(emb(w')))} emb(w)\right), \qquad (2)$$

where $q: \mathbb{R}^n \to \mathbb{R}^h$ is a learned feedforward network, emb: $\mathbb{N} \to \mathbb{R}^n$ is the word embeddings of w and a: $\mathbb{R}^n \to \mathbb{R}$ the (learned) attentive network that judges how much each word w contributes towards the final representation b(m).

The message embeddings are passed onto the thread-level encoder 720 LSTM to produce a thread embeddings vector:

$$[e_1 \ldots e_{|x|}] = r(b(m_1) \ldots b(m_{|x|}))$$

Thread embeddings 725 are then passed to the predictor layer 730, and also to the succeeding row as indicated at 735 for use in updating the thread embeddings 726 with the next email in the thread. In one embodiment, the predictions, generated actions 745, are distributions over possible labels. The predictor $h_t$ is therefore designed to be a two-layered feed forward network p that maps thread embeddings to distributions over Vt, the label set of task t: $h_t(e_1 \ldots e_{|x|}) = [p(\cdot | e_1) \ldots p(\cdot | d_{|x|})]$. The accompanying loss is naturally defined as the cross entropy between the predictions $p(e_1) \ldots p(e_{|x|})$ and the empirical distribution $\hat{y} = \hat{y}_1 \ldots |x|$:

$$\ell_t(\hat{y}, e_{1\ldots|x|}) = \frac{\sum_{i=1}^{|x|} -\hat{y}_i \log p(\hat{y}_i \mid e_i)}{|x|}. \qquad (3)$$

RAINBOW is an extension of Deep Averaging Networks to threaded message modeling. It works well for tagging threaded messages for the messages' properties, such as conversation-turn marking in online chats and end-of-thread detection in emails. However, in its current form, the model is trained to work on exactly one task. It also does not capture the shared dynamics of these different domains jointly when given out-of-domain data. In various embodiments, a family of reparameterized recurrent neural networks easily accommodates multi-domain multi-task learning settings.

Figure 8:
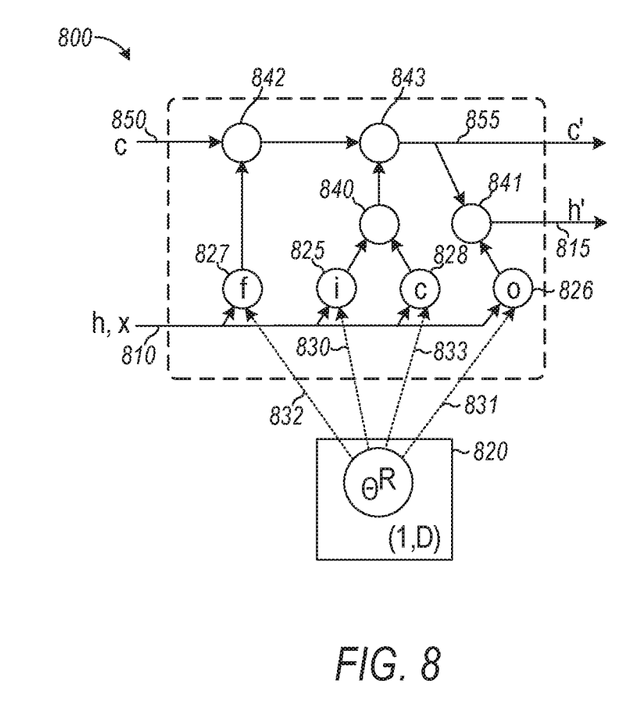
FIG. 8 is a partial computation graph consisting of a single RNN long short-term memory (LSTM) cell according to an example embodiment.

FIG. 8 is a partial computation graph consisting of a single LSTM cell 800. In general, recurrent neural networks take a sequence of input data x 810 and recurrently apply a nonlinear function, to get a sequence of transformed representation h, as indicated at 815. In this example, the transformation is represented with the function $f_{RNN}$ parameterized by the RNN parameters $\theta^R$ at 820 as $h = f_{RNN}(x; \theta^R)$. For an LSTM model, $\theta^R$ 820 can be formulated as the concatenated vector of input, output, forget and cell gate parameters [$W_i; W_o; W_f; W_c$] indicated at 825, 826, 827, and 828 respectively. The dotted lines 830, 831, 832, and 833 represent parameterization. Non-parameterized functions are indicated at 840, 841, 842, and 843. The cell 800 state, c, is represented at 850 and a changed cell state c' is shown at 855. In general, the goal of training an RNN is to find the optimal real-valued vector $\theta^{[<]BEGINITALmR}$ such that $\theta^R = \arg\min_{\theta^R} L(f_{RNN}(x; \theta^R))$, for a given loss function L.

In the context of multidomain learning, in analogy eq. (1) is parameterized as:

$$L_{MT}(\{\{y^{(d)}_{1\ldots K_d}, \hat{y}^{(d)}_{1\ldots K_d}\} \mid d \in D\}) =$$

$$L_{MT}(\{\{h(x^{(d)}_1) \ldots h(x^{(d)}_{K_d}), \hat{y}^{(d)}_{1\ldots K_d}\} \mid d \in D\}) = \sum_{t, x, \hat{y}} \ell_t(h(x), \hat{y}; \theta^R_t).$$

Two modeling choices are available. Either every task t is modeled DISJOINTly or with TIED parameters. The DISJOINT approach learns a separate set of parameters $\theta^R_t$ per task t. Therefore, performance of a task is little affected by data from other domain/tasks, except for the regularizing effect through the word embeddings.

On the other hand, the TIED approach ties parameters of all domains to a single $\theta^R$, which has been a popular choice for multitask/domain modeling—it has been found that the RNN often learns to encode a good shared representation when trained jointly for different tasks. The network also seems to generalize over different domains. However, the value of the shared representation hinges on the assumption that either all domains are similar or the network is capable enough to capture the dynamics of data from all domains at the same time.

Figure 9:
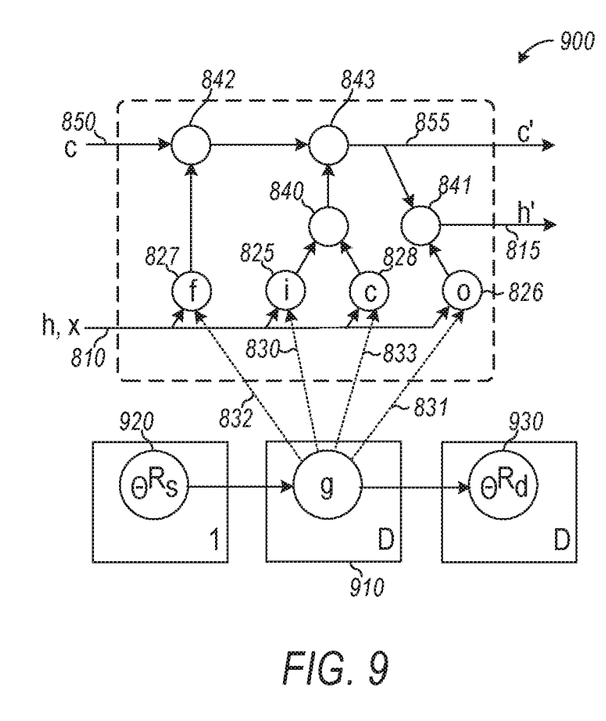
FIG. 9 is a computation graph of an RNN LSTM cell reparametrized with shared and domain specific components according to an example embodiment.

An alternative approach is illustrated in a computation graph of a parameter-shared LSTM cell 900 in FIG. 9. Instead of having a single set of parameters $\hat{\theta}^R$ for all domains, $\theta^R$ is reparametrized as a function $\phi$ 910 of shared components $\theta^{R_s}$ 920 and domain specific components $\theta^{R_d}$ 930. Namely:

$$\theta^R = \phi(\theta^{R_s}, \theta^{R_d}), \qquad (4)$$

and a goal becomes minimizing the loss w.r.t both ($\theta^{R_s}, \theta^{R_d}$):

$$\hat{\theta}^{R_s}, \hat{\theta}^{R_d} = \underset{\hat{\theta}^{R_s}, \hat{\theta}^{R_d}}{\operatorname{argmin}} \sum \ell_t(x, \hat{y}; \hat{\theta}^{R_s}, \hat{\theta}^{R_d}). \quad (5)$$

A comparison between a regular RNN and an RNN modified to to reparametrize $\theta^R$ based on both shared components and domain specific components is illustrated in FIGS. 8 and 9 respectively. Reparametrization allows sharing parameters among networks trained on data of different domains with the shared component $\theta_s$, while allowing the network to work differently on data from each domain with the domain specific parameters $\theta_d$.

The design of the function $\phi$ requires striking a balance between model flexibility and generalizability. The following different variants of reparametrizing $\theta^R$ by different functions $\phi$ (and their abbreviations used herein) may be considered:

Additive (ADD): Consider $\phi$ to be a linear interpolation of a shared base $\theta^{R_s}$ and a network specific component $\theta^{R_d}$:

$$\theta^R = \phi_{ADD}(\theta^{R_s}, \theta^{R_d}; u_d) = \theta^{R_s} + \exp(u_d)\theta^{R_d}, \quad (6)$$

where $u_d \in \mathbb{N}$ is a learned parameter. In this formulation ADD a shared $\theta^{R_s}$ is learned, along with additive domain-specific parameters $\{\theta^{R_d} | d \in D\}$ for each domain. $u_d$ controls how much effect $\theta^{R_d}$ has on the final parameters.

Both DISJOINT and TIED can be seen as degenerate cases of ADD: DISJOINT is recovered when the shared component is a zero vector: $\theta^{R_s}=0$ And with $u_d \to -\infty$ we have $\theta^R = \theta^{R_s}$, namely TIED.

Additive+Multiplicative (ADDMUL) ADD has no non-linear interaction between $\theta^{R_s}$ and $\theta^{R_d}$: they have independent effects on the composite $\theta^R$. In ADDMUL there are two components in $\theta^{R_d} = [\theta^{R_{da}}, \theta^{R_{dm}}]$: the additive component $\theta^{R_{da}}$ and the multiplicative component $\theta^{R_{dm}}$ which introduces nonlinearity without significantly increasing the parameter count:

$$\theta^R = \phi_{ADDMUL}(\theta^{R_s}, \theta^{R_d}; u_d, v_d) = \theta^{R_s} + \exp(u_d)\theta^{R_{da}} + \exp(v_d) \theta^{R_{dm}} \otimes \theta_s, \quad (7)$$

where $\otimes$ is the Hadamard product and $u_d, v_d \in \mathbb{R}$ are learned parameters as in the ADD formulation.

Affine (AFFINE) In this formulation $\theta^{R_d}$ are seen as task embeddings. A learned affine transformation $W$ is applied to the task embeddings and add up the shared component $\theta^{R_s}$:

$$\theta^R = \text{AFFINE}(\theta^{R_s}, \theta^{R_d}; W) = \theta^{R_s} + W\theta^{R_d}, \quad (8)$$

where $W$ is a learned parameter.

Optimization for the multidomain loss as defined in eq. (1) is performed with gradient descent methods. To update parameters, one thread from each domain ($m_d | d \in d$) is sampled and the network parameters are optimized with an Adam optimizer, which is an algorithm for first-order gradient-based optimization of stochastic objective functions, based on adaptive estimates of lower-order moments. Other optimizers may be used in further embodiments such as Stochastic Gradient Descent, Adadelta, RMSPROP, or Adagrad for example.

Figure 10:
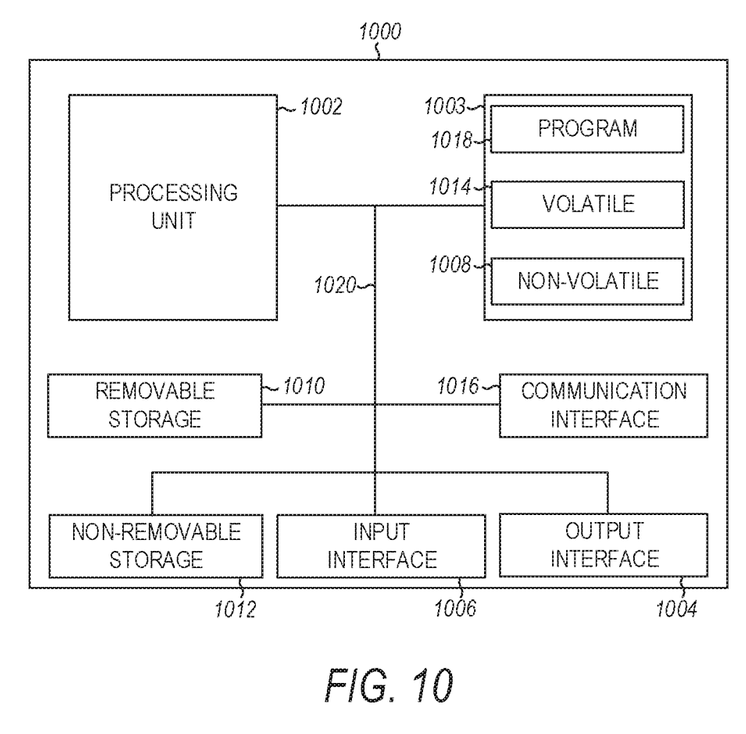
FIG. 10 is a block diagram of circuitry for example devices to perform methods and algorithms according to example embodiments.

FIG. 10 is a block schematic diagram of a computer system 1000 to implement a training system to identify expected actions by recipients of communications such as emails, as well as other devices for performing methods and algorithms according to example embodiments. All components need not be used in various embodiments.

One example computing device in the form of a computer 1000 may include a processing unit 1002, memory 1003, removable storage 1010, and non-removable storage 1012. Although the example computing device is illustrated and described as computer 1000, the computing device may be in different forms in different embodiments. For example, the computing device may instead be a smartphone, a tablet, smartwatch, smart storage device (SSD), or other computing device including the same or similar elements as illustrated and described with regard to FIG. 10. Devices, such as smartphones, tablets, and smartwatches, are generally collectively referred to as mobile devices or user equipment. Further, although the various data storage elements are illustrated as part of the computer 1000, the storage may also or alternatively include cloud-based storage accessible via a network, such as the Internet or server based storage. Note also that an SSD may include a processor on which the parser may be run, allowing transfer of parsed, filtered data through I/O channels between the SSD and main memory.

Memory 1003 may include volatile memory 1014 and non-volatile memory 1008. Computer 1000 may include—or have access to a computing environment that includes—a variety of computer-readable media, such as volatile memory 1014 and non-volatile memory 1008, removable storage 1010 and non-removable storage 1012. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1000 may include or have access to a computing environment that includes input interface 10010, output interface 1004, and a communication interface 1016. Output interface 1004 may include a display device, such as a touchscreen, that also may serve as an input device. The input interface 1006 may include one or more of a touchscreen, touchpad, mouse, keyboard, camera, one or more device-specific buttons, one or more sensors integrated within or coupled via wired or wireless data connections to the computer 1000, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular. Wi-Fi, Bluetooth, or other networks. According to one embodiment, the various components of computer 1000 are connected with a system bus 1020.

Computer-readable instructions stored on a computer-readable medium are executable by the processing unit 1002 of the computer 1000, such as a program 1018. The program 1018 in some embodiments comprises software that, when executed by the processing unit 1002, performs network switch operations according to any of the embodiments included herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 1018 may be used to cause processing unit 1002 to perform one or more methods or algorithms described herein.

EXAMPLES

In example 1, a method includes receiving an email addressed to a recipient user, processing the received email using a reparametrized recurrent neural network model to identify an action based on the received email, and wherein the reparametrized recurrent neural network model has been trained on an email dataset annotated with recipient corresponding actions and reparametrized on unannotated conversation data having structures similar to email data.

Example 2 includes the method of example 1 wherein the model is reparametrized as a function of shared components and domain specific components to provide multi-domain, multi-task learning.

Example 3 includes the method of any of the previous examples wherein the reparametrization function adds the shared and domain specific components, with domain specific components varied in weight for each domain.

Example 4 includes the method of any of the previous examples wherein the reparametrization function adds and multiplies the shared and domain specific components, with domain specific components varied in weight for each domain for adding and a separate multiplicative component to introduce nonlinearity.

Example 5 includes the method of any of the previous examples and further comprising generating one or more actions corresponding to the identified action.

Example 6 includes the method of any of the previous examples and further comprising executing at least one of the one or more generated actions responsive to user selection of the at least one or more generated actions.

Example 7 includes the method of any of the previous examples wherein the generated action comprises an email response with text of the email response being responsive to an identified question in the received email, and wherein executing the generated action comprises sending the email response.

Example 8 includes the method of any of the previous examples wherein the generated action comprises a calendar appointment response with a time, date, and attendees of the calendar appointment being, the calendar appointment responsive to the received email, and wherein executing the generated action comprises sending the calendar appointment to the attendees.

Example 9 includes the method of any of the previous examples wherein the annotated emails are annotated with one or more of the annotations selected from the group of categories consisting of message sending, software interaction, and share content.

Example 10 includes the method of any of the previous examples wherein the unannotated conversation data is labeled with labels corresponding to turn taking and end of a thread which correspond to structure similar to email structure.

Example 11 includes the method of any of the previous examples wherein the reparametrized recurrent neural network model is trained on an email dataset annotated with recipient corresponding actions by encoding the annotated email dataset using a Recurrent AttentIve Neural Bag-Of-Word model (RAINBOW) as a baseline model with two encoding layers comprising encoding each email into message embeddings and encoding each thread into thread embeddings as a function of previous thread embeddings. In example 12 a machine-readable storage device has instructions for execution by a processor of a machine to cause the processor to perform operations to perform a method of generating a model. The method includes receiving a communication addressed to a recipient user, processing the received communication using a reparametrized recurrent neural network model to identify an action based on the received email, and wherein the reparametrized recurrent neural network model has been trained on a communication dataset annotated with recipient corresponding actions and reparametrized on unannotated conversation data having structures similar to the communication dataset data.

Example 13 includes the method of any of the previous examples wherein the model is reparametrized as a function of shared components and domain specific components to provide multi-domain, multi-task learning.

Example 14 includes the method of any of the previous examples wherein the reparametrization function adds the shared and domain specific components, with domain specific components varied in weight for each domain.

Example 15 includes the method of any of the previous examples wherein the reparametrization function adds and multiplies the shared and domain specific components, with domain specific components varied in weight for each domain for adding and a separate multiplicative component to introduce nonlinearity.

Example 16 includes the method of any of the previous examples and further comprising generating one or more actions corresponding to the identified action.

Example 17 includes the method of any of the previous examples and further comprising executing at least one of the one or more generated actions responsive to user selection of the at least one or more generated actions.

Example 18 includes the method of any of the previous examples wherein the generated action comprises an email response with text of the email response being responsive to an identified question in the received communication, and wherein executing the generated action comprises sending the email response.

Example 19 includes the method of any of the previous examples wherein the generated action comprises a calendar appointment response with a time, date, and attendees of the calendar appointment being responsive to the received communication, and wherein executing the generated action comprises sending the calendar appointment to the attendees.

Example 20 includes the method of any of the previous examples wherein the annotated communications are annotated with one or more of the annotations selected from the group of categories consisting of message sending, software interaction, and share content.

Example 21 includes the method of any of the previous examples wherein the unannotated conversation data is labeled with labels corresponding to turn taking and end of a thread which correspond to structure similar to the communication dataset.

Example 22 includes the method of any of the previous examples wherein the reparametrized recurrent neural network model is trained on an email dataset annotated with recipient corresponding actions by encoding the annotated email dataset using a Recurrent AttentIve Neural Bag-Of-Word model (RAINBOW) as a baseline model with two encoding layers comprising encoding each email into message embeddings and encoding each thread into thread embeddings as a function of previous thread embeddings.

In example 23, a system includes one or more processors and a storage device coupled to the one or more processors having instructions stored thereon to cause the one or more processors to execute intent recognition operations. The operations include receiving a communication addressed to a recipient user, processing the received communication using a reparametrized recurrent neural network model to identify an action based on the received communication, and wherein the reparametrized recurrent neural network model has been trained on a communication dataset from a first domain, annotated with recipient corresponding actions, wherein the first domain correlates to the received communication, and reparametrized on unannotated conversation data from a second domain having structures similar to email data.

Example 24 includes the method of any of the previous examples wherein the model is reparametrized as a function of shared components and domain specific components to provide multi-domain, multi-task learning.

Example 25 includes the method of any of the previous examples wherein the reparametrization function adds the shared and domain specific components, with domain specific components varied in weight for each domain.

Example 26 includes the method of any of the previous examples wherein the reparametrization function adds and multiplies the shared and domain specific components, with domain specific components varied in weight for each domain for adding and a separate multiplicative component to introduce nonlinearity.

Example 27 includes the method of any of the previous examples and further comprising generating one or more actions corresponding to the identified action.

Example 28 includes the method of any of the previous examples and further comprising executing at least one of the one or more generated actions responsive to user selection of the at least one or more generated actions.

Example 29 includes the method of any of the previous examples wherein the generated action comprises an email response with text of the email response being responsive to an identified question in the received communication, and wherein executing the generated action comprises sending the email response.

Example 31 includes the method of any of the previous examples wherein the generated action comprises a calendar appointment response with a time, date, and attendees of the calendar appointment being responsive to the received communication, and wherein executing the generated action comprises sending the calendar appointment to the attendees.

Example 32 includes the method of any of the previous examples wherein the annotated communications are annotated with one or more of the annotations selected from the group of categories consisting of message sending, software interaction, and share content.

Example 33 includes the method of any of the previous examples wherein the unannotated conversation data of the second domain is labeled with labels corresponding to turn taking and end of a thread which correspond to structure similar to the communication dataset of the first domain.

Example 34 includes the method of any of the previous examples wherein the reparametrized recurrent neural network model is trained on an email dataset of the first domain annotated with recipient corresponding actions by encoding the annotated email dataset using a Recurrent AttentIve Neural Bag-Of-Word model (RAINBOW) as a baseline model with two encoding layers comprising encoding each email into message embeddings and encoding each thread into thread embeddings as a function of previous thread embeddings.

In example 35, a computer implemented method of training a recurrent neural network (RNN) for identifying actions responsive to received emails includes operations comprising initializing weights of the RNN, training the RNN on a target domain set of recipient action annotated emails, and reparametrizing the RNN on unannotated conversation data threads.

Example 36 includes the method of any of the previous examples wherein the operations further comprise evaluating the RNN on a validation set of action annotated emails to determine an accuracy of classification and repeating the method of claim 1 until a predetermined number of iterations is reached.

Example 37 includes the method of any of the previous examples wherein the operations further comprise if the determined accuracy is the highest accuracy in the iteration, update the best parameters so far.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
receiving an email addressed to a recipient user;
processing the received email using a reparametrized recurrent neural network model to identify an action based on the received email; and
wherein the reparametrized recurrent neural network model has been:
trained on an email training dataset annotated with recipient corresponding actions; and
reparametrized on non-email unannotated conversation data having structures similar to email data; and
generating one or more actions for execution by the computer responsive to the identified action.

2. The method of claim 1 wherein the model is reparametrized as a function of shared components and domain specific components to provide multi-domain, multitask learning.

3. The method of claim 2 wherein the reparametrization function adds the shared and domain specific components, with domain specific components varied in weight for each domain.

4. The method of claim 2 wherein the reparametrization function adds and multiplies the shared and domain specific components, with domain specific components varied in weight for each domain for adding and a separate multiplicative component to introduce nonlinearity.

5. The method of claim 1 and further comprising executing at least one of the one or more generated actions responsive to user selection of the at least one or more generated actions.

6. The method of claim 5 wherein the generated action comprises an email response with text of the email response being responsive to an identified question in the received email, and wherein executing the generated action comprises sending the email response.

7. The method of claim 5 wherein the generated action comprises a calendar appointment response with a time, date, and attendees of the calendar appointment being, the calendar appointment responsive to the received email, and wherein executing the generated action comprises sending the calendar appointment to the attendees.

8. The method of claim 1 wherein the annotated emails are annotated with one or more of the annotations selected from the group of categories consisting of message sending, software interaction, and share content.

9. The method of claim 1 wherein the unannotated conversation data is labeled with labels corresponding to turn taking and end of a thread which correspond to structure similar to email structure.

10. The method of claim 1 wherein the reparametrized recurrent neural network model is trained on the email training dataset annotated with recipient corresponding actions by encoding the annotated training email dataset using a Recurrent AttentIve Neural Bag-Of-Word model (RAINBOW) as a baseline model with two encoding layers comprising:
   encoding each email into message embeddings; and
   encoding each thread into thread embeddings as a function of previous thread embeddings.

11. A machine-readable storage device having instructions for execution by a processor of a machine to cause the processor to perform operations to perform a method of generating a model, the method comprising:
   receiving a communication addressed to a recipient user;
   processing the received communication using a reparametrized recurrent neural network model to identify an action based on the received communicationemail; and
   wherein the reparametrized recurrent neural network model has been:
      trained on a communication dataset annotated with recipient corresponding actions; and
      reparametrized on unannotated conversation data having structures similar to the communication dataset data; and
   generating one or more actions for execution by the computer responsive to the identified action.

12. The machine-readable storage device of claim 11 wherein the model is reparametrized as a function of shared components and domain specific components to provide multi-domain, multi-task learning, and wherein the reparametrization function adds the shared and domain specific components, with domain specific components varied in weight for each domain and adds and multiplies the shared and domain specific components, with domain specific components varied in weight for each domain for adding and a separate multiplicative component to introduce nonlinearity.

13. The machine-readable storage device of claim 11 and further comprising
   executing at least one of the one or more generated actions responsive to user selection of the at least one or more generated actions.

14. The machine-readable storage device of claim 13 wherein the generated action comprises an email response with text of the email response being responsive to an identified question in the received communication, and wherein executing the generated action comprises sending the email response.

15. The machine-readable storage device of claim 13 wherein the generated action comprises a calendar appointment response with a time, date, and attendees of the calendar appointment being responsive to the received communication, and wherein executing the generated action comprises sending the calendar appointment to the attendees.

16. The machine-readable storage device of claim 11 wherein the annotated communications are annotated with one or more of the annotations selected from the group of categories consisting of message sending, software interaction, and share content.

17. The machine-readable storage device of claim 11 wherein the reparametrized recurrent neural network model is trained on an email dataset annotated with recipient corresponding actions by encoding the annotated email dataset using a Recurrent AttentIve Neural Bag-Of-Word model (RAINBOW) as a baseline model with two encoding layers comprising:
   encoding each email into message embeddings; and
   encoding each thread into thread embeddings as a function of previous thread embeddings.

18. A computer implemented method of training a recurrent neural network (RNN) for identifying actions responsive to received emails, the method including operations comprising:
   initializing weights of the RNN;
   training the RNN on a target domain set of recipient action annotated emails; and
   reparametrizing the RNN on non-email unannotated conversation data threads.

19. The computer implemented method of claim 18 wherein the operations further comprise:
   evaluating the RNN on a validation set of action annotated emails to determine an accuracy of classification;
   repeating the method of claim 1 until a predetermined number of iterations is reached; and
   if the determined accuracy is the highest accuracy in the iteration, updating the best parameters.

* * * * *